(12) United States Patent
Bates

(10) Patent No.: US 6,588,039 B1
(45) Date of Patent: Jul. 8, 2003

(54) PLIER TOOL AND PROCESS

(75) Inventor: Darryle E. Bates, Cuyahoga Falls, OH (US)

(73) Assignee: Stride Tool, Inc., Ellicottville, NY (US)

( * ) Notice: Subject to any disclaimer, the term of this patent is extended or adjusted under 35 U.S.C. 154(b) by 0 days.

(21) Appl. No.: 10/103,340

(22) Filed: Mar. 21, 2002

(51) Int. Cl.[7] ............................................. B25F 1/00
(52) U.S. Cl. .............................................. 7/107; 81/9.4
(58) Field of Search ............................ 7/107, 127, 128, 7/129, 132, 158; 81/9.4, 9.44; 30/90.1, 90.4, 90.6, 90.8

(56) References Cited

U.S. PATENT DOCUMENTS

| | | | |
|---|---|---|---|
| 304,089 A | 8/1884 | Entrekin | |
| 591,720 A | 10/1897 | Armstrong | |
| 1,388,398 A | 8/1921 | Adams | |
| 1,805,276 A | 5/1931 | Chucto | |
| 3,831,207 A | 8/1974 | Boyajian | |
| 3,871,078 A | 3/1975 | Ogle | |
| 3,947,904 A * | 4/1976 | Hayes | 7/107 |
| 3,947,905 A | 4/1976 | Neff | |
| 4,083,105 A | 4/1978 | ViPond | |
| 4,953,248 A * | 9/1990 | Trombetta | 7/107 |
| 5,062,192 A | 11/1991 | Sawyer et al. | |
| 5,323,502 A | 6/1994 | Miller | |
| 5,575,029 A | 11/1996 | Simpson | |
| 5,711,182 A | 1/1998 | Yang | |
| 5,826,338 A * | 10/1998 | Chilton et al. | 30/131 |
| 5,894,617 A | 4/1999 | Liou | |
| 6,029,297 A | 2/2000 | French | |
| 6,079,105 A | 6/2000 | Hollingsworth | |
| 6,234,050 B1 * | 5/2001 | Konen et al. | 81/417 |

* cited by examiner

*Primary Examiner*—Joseph Hail, III
*Assistant Examiner*—Hadi Shakeri
(74) *Attorney, Agent, or Firm*—Watts, Hoffmann, Fisher & Heinke Co., L.P.A.

(57) ABSTRACT

A plier tool for cutting multi-conductor electrical cables is disclosed. The tool has a pair of levers having pivotally connected boss portions. The levers also having coacting handle and jaw portions on opposite sides of the boss portions such that upon manipulation of the handles toward one another the jaw portions close to perform a work operation. The jaw portions include coactable cutter sections each having stepped parts oriented such that on closure on a multi-conductor cable a first pair of the parts will substantially sever a first conductor before a second pair of the parts commences to sever a second conductor.

9 Claims, 3 Drawing Sheets

PLIER TOOL AND PROCESS

This invention relates to plier tools and more particularly to that class of plier tool which is especially suited for use with three wire insulated electrical cable and a process of severing such cable.

BACKGROUND OF THE INVENTION

Three wire insulated electrical cables such as those sold under the trademark Romex are now widely used for many applications such as distributing electricity in residential units. These cables include spaced positive and negative insulated conductors with a ground conductor wire disposed between them. In copending application for Pat. Ser. No. 09/185,493 filed Nov. 3, 1998 a tool and method for stripping sheathing from the wires is disclosed. While the tool and process taught in that Application have greatly improved and simplified the preparation of an end section of a three wire cable for connection to an electrical device such as a switch or light fixture their remains a problem in that cutting such cables to length is difficult and requires high force. The need for high force occurs in part because with a conventional plier type cutting tool an operator is attempting to cut through all three wires at the same time during a substantial portion of the cutting operation. Accordingly, it would be desirable to provide a plier tool which is effective to sever three wire cables with substantially reduced force.

The orientation of cutting edges of conventional cutter has been found to be a further reason that high forces are required. With typical wire cutters, cooperating cutting edges are each located in an imaginary plane including the pivot axis of the cutting levers. As a consequence forces applied to a cylindrical wire being cut include vectors tending to push the wire away from the cutter's pivot and thus out from between the cutter edges. Force wasted in these outward vectors result in a higher total force being needed to effect a closure of the cutting tool and severance of a wire. Moreover, some amount of force must be applied to the wire being cut to resist its being urged out from between the cutter edges. Expressed another way, the straight cutter edges of the prior art induce forces that tend to push the wire away from the pivot, thus decreasing the mechanical leverage and increasing the force need to effect cutting.

SUMMARY OF THE INVENTION

The tool of the present invention comprises a pair of levers with pivotally connected boss sections. Each of the levers has a handle section projecting in one direction from the boss section and a jaw section projecting in the opposite direction such that the handles and the jaws are respectively coactable.

With the tool of the present invention coacting stepped, non parallel cutter blades are provided in the jaw sections. Each blade has three interconnected parts respectively for cutting the three wires of a Romex type cable. A central one of the three parts is offset from an end part which is nearest the plier pivot. The offset in a direction which is transverse to the jaws cutting action. The third part which is remote from the pivot and substantially adjacent to central part is offset from the central part transversely of the tool such that three parts are of a stepped configuration.

One of the outstanding of the features of the invention is that cutting edges of each of the pairs of cutting parts are oriented such that they are either parallel or canted outwardly in the direction toward the pivot. In contrast to the prior art the cutting edges do not tend to push a wire being cut away from the pivot but rather exert all forces radially of the wire or apply forces such that the cutter edges tend to push the wire being cut toward the pivot. To accomplish this orientation, the edges of each pair of cutter parts are other than parallel to corresponding edges of the other two cutting parts so that as the tool is closed successively on the three wires the cutting forces applied to each of the wires being cut are either radial or include a vector tending to push the wire being cut toward the pivot. This cutter edge orientation results in a significant reduction in the forces required to effect cutting.

The inward angling of the cutter parts minimizes the opening span needed to cut a cable of the type a tool is designed to cut. Since the opening is minimized, so to is the spreading of the handles which contributes to comfortable positioning of the handles when cuts are being initiated. Further, the described orientation of the cutting edges results in the cutter parts each being closer to the pivot axis than the respective parts of a prior art blade cutting the same three wire cable. Thus reducing the arc of travel during a cutting operation. Since the amount of arc travel is reduced so to is the overall handle span from full open to fully closed with the consequence that the handle span is within a comfortable range for a user.

The transverse offset and orientation of the blade parts enables the sequential cutting of the three wires of a cable of a size the tool is designed to cut. In the preferred arrangement a first of the conductive wires will be about 80 percent severed by the cutter parts nearest the pivot before the central part commences to cut the ground conductor. In turn the ground conductor will be about 80 percent severed and the first conductor fully severed when the cutter part remote from the pivot commences to sever the second conductor. Tests on each standard size Romex type cable have shown forces required to cut a cable are reduced from 33 to 40 percent as compared with good quality prior art three wire cable cutters. Moreover this tool is also effective to cut European type cables with corresponding force reductions.

Accordingly, the objects of the invention are to provide a novel and improved plier tool for severing multiwire cable and a process of severing such cable.

DETAILED DESCRIPTION OF THE PREFERRED EMBODIMENT

Figure 1:
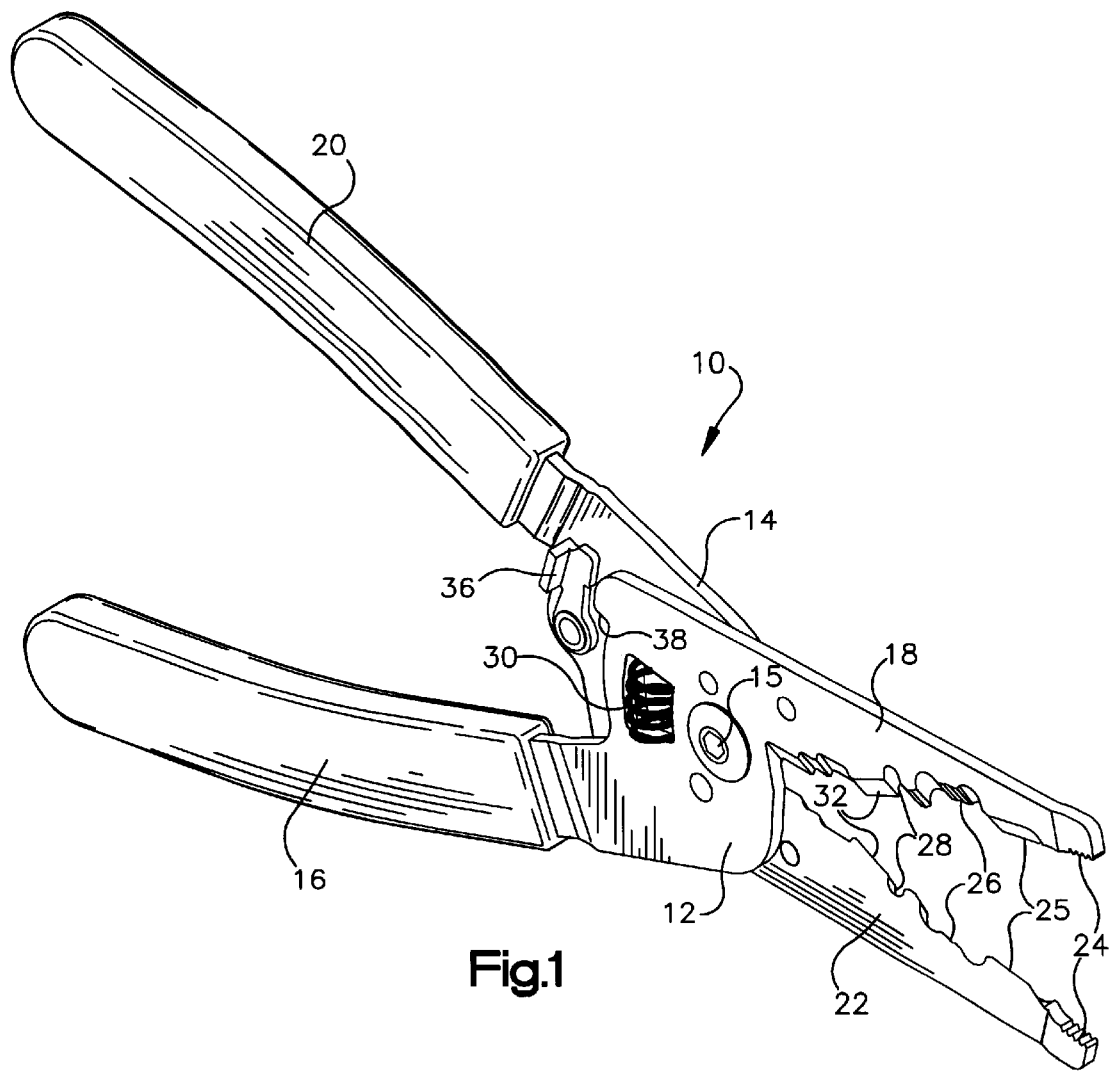
FIG. 1 is a perspective view of the tool of the present invention.
Figure 2:
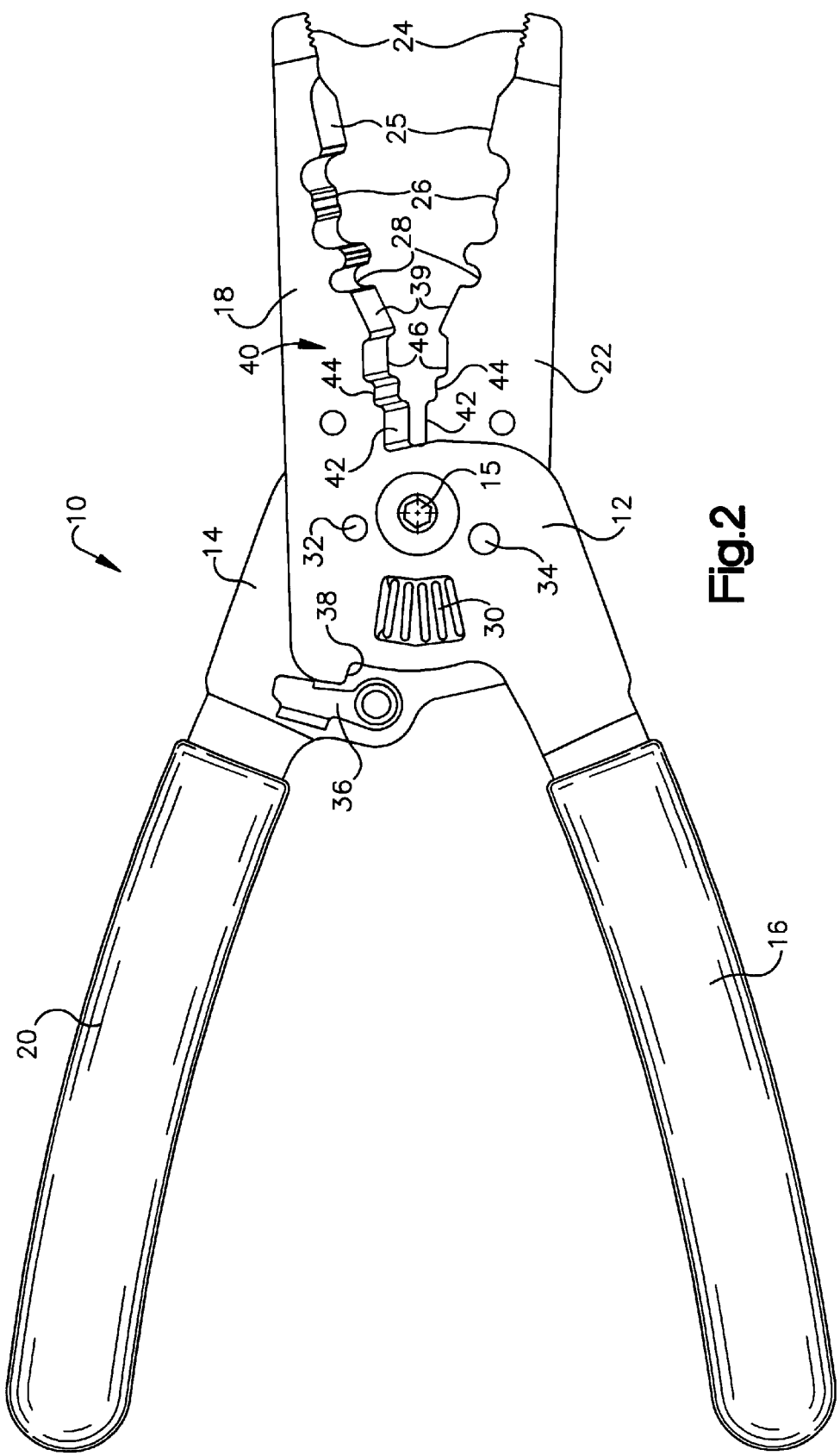
FIG. 2 is a plan view of the tool.

Referring now to the drawings a plier tool is shown generally at 10. The tool has a pair of levers having respective boss sections 12, 14 connected together by a pivot 15. A first of the levers having the boss section 12 also has handle and jaw sections 16, 18. The other of the handles having the boss section 14 includes a handle section 20 and a jaw section 22.

The jaw sections 18 and 22 are designed to perform operations on a specific size of three wire insulated cable of the Romex type. Commencing from the outboard end or the right side as viewed in FIG. 1, the jaw sections include the usual end gripper parts 24. A pair of wire cutter blades 25 are adjacent to and on the boss side of the gripper parts 24. Sheath cutting and stripping cutters 26 are adjacent the wire cutter blades 25 inward of the gripper parts and toward the pivot. A wire stripper portion 28 is provided on the jaws near the sheath stripper 26 and between the sheath stripper and the pivot.

The disclosed tool includes a captured spring 30 of the type described and claimed in U.S. Pat. No. 4,607,548 issued Aug. 26, 1986 to J. Anderson. The bosses 12, 14 also include the usual bolt cutting apertures 32, 34. A pivotal latch 36 is mounted on the boss section 14. The latch 36 is coactable with a shoulder 38 formed in the boss section 12. The latch functions selectively to maintain the levers in a closed position (not shown).

The outstanding advantages of the invention are provided by the portions of the jaws 16, 18 between the wire stripper portion 28 and the bosses. This portion includes a sheath cutting part 39 adjacent the wire stripper 28. A stepped wire cutter 40 is between sheath cutting part 39 and the bosses.

The cutter 40 includes a first part 42 which is both a sheath and insulation cutter and a first conductor wire cutter. The first part 42 is between a central part 44 and the bosses while a third cutter part 46 is between the sheath cutter 39 and the central part 44. As will be seen by an examination of the drawings, the central part 44 of each of the cutters 40 is offset laterally outwardly from the first cutter part 42. The third cutter part 46 is in turn offset laterally outwardly from the central part 44.

Figure 3:
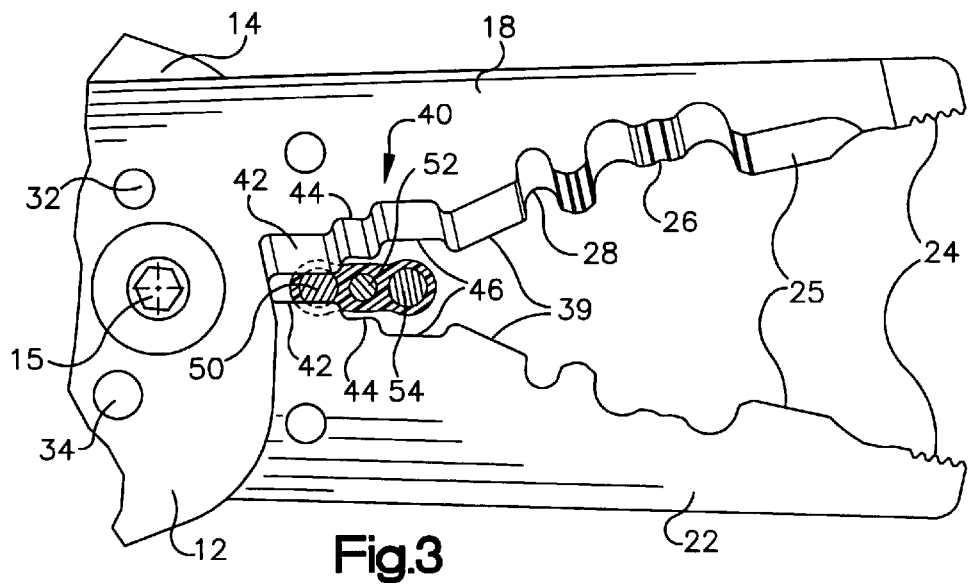
FIGS. 3–5 are foreshortened plan views of the tool jaw illustrating in progressive steps the severance of a sheathed 3 wire cable.
Figure 4:
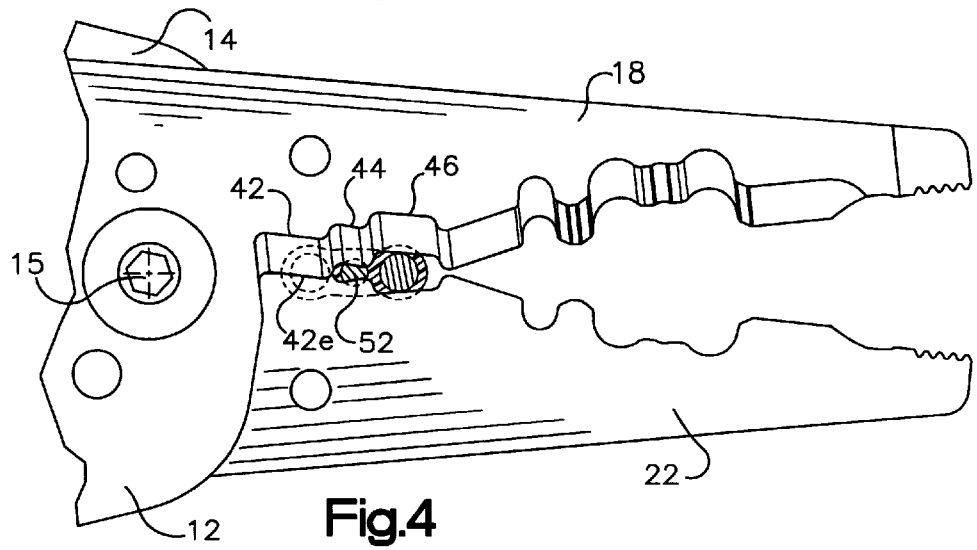

The orientation of the three cutter parts 42, 44, 46 is best understood by reference to FIGS. 3–4. As is best seen in FIG. 4, a cutting edge 42e of the cutting part 42 is slanted from an imaginary plane including the axis of a pivot 15. Thus if one imagines a plane located by the pivot axis and the end of the cutting edge 42e remote from the pivot, it will be seen that the inner end of the cutting edge 42e is spaced from such imaginary plane. Thus each cutting edge of each of the parts 42, 44, 46 flares outwardly in a direction toward the pivot 15. Moreover, the amount of flare of each of the cutting parts is different such that the respective edges of the cutting parts 42, 44, 46 on the jaw 18 and on the jaw 22 are other than parallel with one another. This non parallel relationship assures that cutting forces applied by the cutting parts are either radial of a wire being cut or include a vector tending to push the wire being cut toward the pivot 15.

Operation

Figure 5:
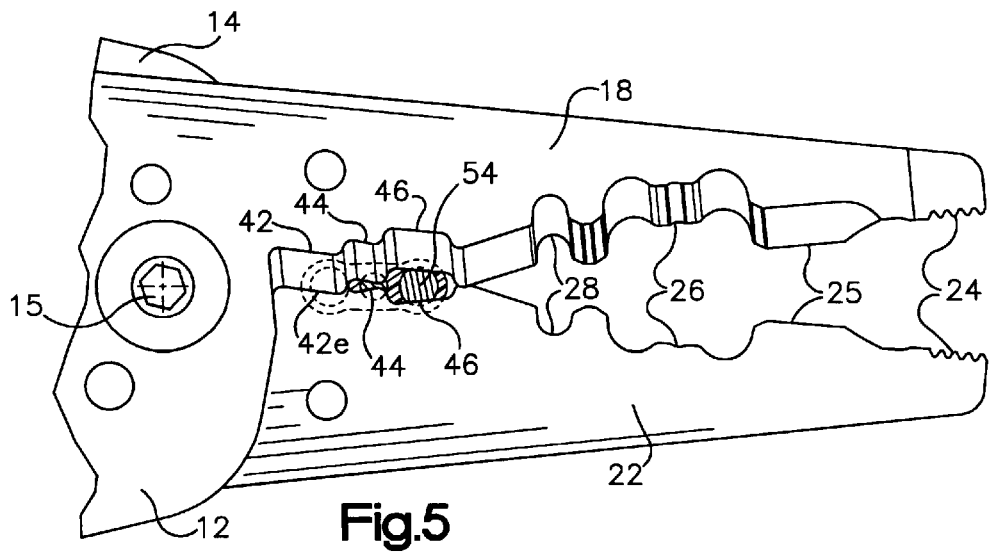

When the tool is used to prepare a sheathed cable for an electrical connection it is first necessary to cut the cable to length. To that end the jaws are opened, and the tool is located longitudinally along a piece of cable at the place where the cable is to be severed. The handles are then brought together forcing the first cutter parts 42 into the cable and into a first and outboard one of the conductive wires 50, FIG. 3. When the first cutter parts 42 have completed about 80 percent of the severance of the conductor 50, the central parts 44 engage and commence to cut a central or ground wire 52, FIG. 4. When the ground wire is about 80 percent severed and the conductor 50 has been completely severed, the third cutter parts 46 will commence to sever the second of the cables conductors are wires 54, FIG. 5. Should the cable sheath extend beyond the third cutter part 46, the sheath cutter part 39 is effective to cut it. Closure continues until the full cable is severed.

Following the severing of the cable to length, an end part of a section of the sheath of a work piece will be severed by operation of the sheath stripper 26. Thereafter end portions of the wires will be stripped of insulation through use of the wire stripper 28 and the cable has been prepared for connection to an electrical device.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

What is claimed is:

1. A plier tool for cutting multi-conductor electrical cables comprising:

a) a pair of levers having pivotally connected boss portions;

b) the levers also having coacting handle and jaw portions on opposite sides of the boss portions such that upon manipulation of the handles toward one another the jaw portions close to perform a work operation; and, c) the jaw portions including coactable cutter sections each having stepped conductor severing parts oriented such that on closure on a multi-conductor cable a first pair of the parts will substantially sever a first conductor before a second pair of the parts commences to sever a second conductor.

2. The tool of claim 1, wherein there are three pairs of cutter parts and when in use the first pair of the parts will have completely severed said first conductor before a third pair of parts commences to sever a third conductor.

3. The tool of claim 1 wherein the jaw portion further includes a sheath stripper section.

4. The tool of claim 3 wherein the jaw portions further include a wire stripper section.

5. The tool of claim 1 wherein the jaw portions further include a wire stripper section.

6. A plier tool for cutting three conductor electrical cables comprising:

a) a pair of levers having pivotally connected boss portions;

b) the levers also having coacting handle and jaw portions on opposite sides of the boss portions such that upon manipulation of the handles toward one another the jaw portions close to perform work operations;

c) the jaw portions including coactable cutter sections with each section having three stepped parts oriented such that on closure on a three conductor cable a first pair of the parts will substantially sever a first conductor before a second pair of the parts commences to sever a central conductor;

d) a third pair of parts being positioned such that on closing the second conductor will be substantially severed before severance of a third conductor commences;

e) each of the pairs of cutter parts having respective cutting edges with an end of each edge near the boss being spaced from an imaginary plane located by an axis of the pivotal connection and another end of the same edge remote from the boss part.

7. The tool of claim 6 wherein each cutting edge is other than parallel with the other cutting edges of the same cutter section.

8. The tool of claim 7 wherein the jaw portions further include a wire stripper section.

9. The tool of claim 6 wherein the jaw portions further include a wire stripper section.

\* \* \* \* \*